US009714610B2

(12) United States Patent
Snape et al.

(10) Patent No.: US 9,714,610 B2
(45) Date of Patent: Jul. 25, 2017

(54) LOW PROFILE COMPRESSOR BLEED AIR-OIL COOLERS

(71) Applicant: United Technologies Corporation, Farmington, CT (US)

(72) Inventors: Nathan Snape, Tolland, CT (US); Gabriel L. Suciu, Glastonbury, CT (US); Simon Pickford, Amston, CT (US); Allan R. Penda, Amston, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 850 days.

(21) Appl. No.: 13/645,067

(22) Filed: Oct. 4, 2012

(65) Prior Publication Data
US 2014/0096534 A1    Apr. 10, 2014

(51) Int. Cl.
*F02C 7/14*    (2006.01)
*F02C 6/08*    (2006.01)

(52) U.S. Cl.
CPC ............. *F02C 6/08* (2013.01); *F02C 7/14* (2013.01); *F05D 2260/213* (2013.01); *Y02T 50/672* (2013.01); *Y02T 50/675* (2013.01)

(58) Field of Classification Search
CPC ........ F01D 111/24; F01D 17/105; F02C 7/14; F02C 7/18; F02C 7/185; F02C 6/08; F05B 2220/50; F05D 2260/213; Y02T 50/671; Y02T 50/672; Y02T 50/685
See application file for complete search history.

(56) References Cited

U.S. PATENT DOCUMENTS 4,254,618 A * 3/1981 Elovic .................... F02C 7/185
                                                60/226.1
4,546,605 A * 10/1985 Mortimer et al. ........... 60/226.1
(Continued)

FOREIGN PATENT DOCUMENTS

EP      2336525 A1    6/2011

OTHER PUBLICATIONS

International Search Report and Written Opinion for related International Application No. PCT/US13/57080; report dated May 20, 2014.
(Continued)

*Primary Examiner* — William H Rodriguez
(74) *Attorney, Agent, or Firm* — Cantor Colburn LLP

(57) ABSTRACT

An air-oil cooler (AOC) for a gas turbine engine is disclosed. The AOC may comprise an oil inlet, an oil outlet, and heat exchange elements between the oil inlet and the oil outlet. The AOC may be longitudinally positioned between a fan and a V-groove of the engine and radially spaced between a low pressure compressor and a low pressure compressor panel. A gas turbine engine comprising an AOC is disclosed. The AOC of the engine may comprise an oil inlet, an oil outlet, and heat exchange elements between the oil inlet and the oil outlet. The AOC of the engine may be longitudinally positioned between a fan and a V-groove of the engine and radially spaced between a low pressure compressor and a low pressure compressor panel. A method of operating an AOC for use on a gas turbine engine is also disclosed.

20 Claims, 4 Drawing Sheets

(56) References Cited

U.S. PATENT DOCUMENTS

| | | | | |
|---|---|---|---|---|
| 5,269,135 | A * | 12/1993 | Vermejan | F02C 7/04 60/226.1 |
| 5,392,614 | A | 2/1995 | Coffinberry | |
| 5,678,408 | A | 10/1997 | Janes | |
| 5,706,651 | A | 1/1998 | Lillibridge et al. | |
| 6,106,229 | A * | 8/2000 | Nikkanen | F02C 7/14 415/119 |
| 6,158,399 | A | 12/2000 | Ash et al. | |
| 7,730,715 | B2 * | 6/2010 | Grudnoski et al. | 60/226.1 |
| 7,862,293 | B2 * | 1/2011 | Olver | F01D 25/12 415/169.1 |
| 9,200,570 | B2 * | 12/2015 | Alecu | F02K 3/115 |
| 2008/0053059 | A1 * | 3/2008 | Olver | F02C 7/14 60/226.1 |
| 2008/0053060 | A1 * | 3/2008 | Olver | F02C 7/14 60/226.1 |
| 2008/0095611 | A1 * | 4/2008 | Storage | F01D 25/125 415/116 |
| 2008/0271433 | A1 * | 11/2008 | Olver | F01D 25/12 60/266 |
| 2011/0150634 | A1 | 6/2011 | Bajusz et al. | |
| 2012/0159961 | A1 | 6/2012 | Krautheim et al. | |
| 2013/0098046 | A1 * | 4/2013 | Suciu | F02C 7/08 60/772 |
| 2013/0239588 | A1 * | 9/2013 | Suciu | F02C 7/14 60/806 |
| 2015/0198092 | A1 * | 7/2015 | Weiner | F01D 25/12 415/175 |
| 2015/0247462 | A1 * | 9/2015 | Suciu | F02K 3/115 415/1 |

OTHER PUBLICATIONS

English Abstract for EP2336525A1—Jun. 22, 2011; 1 pg.
European Search Report for Application No. 13857505.5-1607/2904237; Date of Mailing: Jun. 28, 2016; 7 pgs.

* cited by examiner

LOW PROFILE COMPRESSOR BLEED AIR-OIL COOLERS

FIELD OF THE DISCLOSURE

The present disclosure generally relates to a gas turbine engine and, more particularly, relates to an air-oil cooler of a gas turbine engine.

BACKGROUND OF THE DISCLOSURE

A gas turbine engine typically includes a fan section, a compressor, at least one combustor, and a turbine. The desire for improved performance and fuel efficiency in aerospace industry has produced continuous improvement in the specific thrust and specific fuel consumption of gas turbine engines. Accordingly current aircraft engine design trends shift towards higher bypass ratio, low fan pressure ratio type of fan designs for improved fuel consumption. In high bypass ratio arrangements, the propulsion fan section creates most of the thrust provided by the engine. Lower fan pressure ratios may lead to increased propulsive efficiency, and enable thermodynamic cycle changes for improved fuel efficiency along with significant noise reduction. In addition, to improve fuel efficiency, a smaller engine core is preferred to cut down on the total weight of the gas turbine engine. Consequently, the compressors may run hotter than conventional gas turbine engines.

On the other hand, gas turbine engines also typically have various components, such as gears and bearing, which benefit from lubrication and cooling. An oil supply system provides oil, or other lubricating liquid, to the components to complete the lubrication and cooling. Afterward, the oil is typically cooled by air-oil coolers (AOCs) positioned in a gas flow path of the gas turbine engine. AOCs are used in the lubricating systems of some turbine engines to reduce the temperature of the oil to a degree suitable for recirculation through the system. If the gas flow path has a relatively slow air flow, for example, in the case of a smaller core and lower fan pressure ratios, the AOC typically needs to become larger and taller to achieve the desired amount of cooling. A larger and taller AOC not only adds undesirable weight to the small core engine, but also presents a problem of fitting the AOC without excessive drag or nacelle structural issues since the available packaging volume in a small core engine is much smaller than that in a conventional engine. For example, extending the AOC into a bypass flow stream of the engine's propulsion fan would reduce the overall thrust output of the engine, thus, may run counter to the purpose of the small core engine design.

To better answer the challenges raised by the gas turbine industry to produce reliable and high-performance gas turbines engines, in particular, engines with a smaller core, it is therefore desirable to provide an improved AOC which efficiently cools the oil without disrupting the current small core engine design or reducing the thrust output of the engine.

SUMMARY OF THE DISCLOSURE

In accordance with one aspect of the present disclosure, an air-oil cooler for a gas turbine engine is disclosed. The gas turbine may include a fan, a low pressure compressor downstream of the fan, a low pressure compressor panel which is radially outwardly from the low pressure compressor, and a V-groove downstream of the low pressure compressor panel. The air-oil cooler may comprise an oil inlet receiving a hot oil from a component of the gas turbine engine, an oil outlet, and a plurality of heat exchange elements between the oil inlet and the oil outlet. Further, the air-oil cooler may extend circumferentially about the low pressure compressor, be longitudinally located between the fan and the V-groove and radially spaced between the low pressure compressor and the low pressure compressor panel. The air-oil cooler may receive a current of cold air bled from the low pressure compressor.

In a refinement, the air-oil cooler may be subjected to the direct action of the current of cold air, and the cold air may exit through an overboard exhaust of the engine after flowing over the air-oil cooler.

In another refinement, the gas turbine engine may further comprise a core nacelle which is circumferentially around the low pressure compressor. The air-oil cooler may be positioned radially inwardly from the core nacelle.

In another refinement, the gas turbine engine may further comprise a firewall downstream of the low pressure compressor panel. The air-oil cooler may be longitudinally located between the fan and the firewall.

In another refinement, the heat exchange elements of the air-oil cooler may have a one-pass configuration.

In another refinement, the heat exchange elements of the air-oil cooler may have a two-pass configuration.

In still another refinement, the air-oil cooler may be positioned in a cavity between the low pressure compressor and the low pressure compressor panel. The cavity may have a height/length ratio of at least 1.5:1.

In accordance with another aspect of the present disclosure, a gas turbine engine is disclosed. The gas turbine may include a fan, a low pressure compressor downstream of the fan, a low pressure compressor panel which is radially outwardly from the low pressure compressor, a V-groove downstream of the low pressure compressor panel, and an air-oil cooler. The air-oil cooler of the gas turbine engine may comprise an oil inlet receiving a hot oil from a component of the gas turbine engine, an oil outlet, and a plurality of heat exchange elements between the oil inlet and the oil outlet. Further, the air-oil cooler of the gas turbine engine may extend circumferentially about the low pressure compressor. The air-oil cooler of the gas turbine engine may be longitudinally located between the fan and the V-groove and radially spaced between the low pressure compressor and the low pressure compressor panel. The air-oil cooler of the gas turbine engine may receive a current of cold air bled from the low pressure compressor.

In a refinement, the air-oil cooler of the gas turbine engine may be subjected to the direct action of the current of cold air. The cold air may exit through an overboard exhaust of the engine after flowing over the air-oil cooler.

In another refinement, the gas turbine engine may further comprise a core nacelle which is circumferentially around the low pressure compressor. The air-oil cooler may be positioned radially downwardly from the core nacelle.

In another refinement, the gas turbine engine may further comprise a firewall downstream of the low pressure compressor panel. The air-oil cooler may be longitudinally located between the fan and the firewall.

In another refinement, the heat exchange elements of the air-oil cooler of the gas turbine engine may have a one-pass configuration.

In another refinement, the heat exchange elements of the air-oil cooler of the gas turbine engine may have a two-pass configuration.

In still another refinement, the air-oil cooler of the gas turbine engine may be positioned in a cavity between the low pressure compressor and the low pressure compressor panel. The cavity may have a height/length ratio of at least 1.5:1.

In accordance with another aspect of the present disclosure, a method of operating an air-oil cooler for use on a gas turbine engine is disclosed.

The method may comprise the steps of: providing the air-oil cooler with an oil inlet receiving a hot oil from a first component of the gas turbine engine, an oil outlet, and a plurality of heat exchange elements between the oil inlet and oil outlet; placing the air-oil cooler longitudinally between the fan and the V-groove and radially between the low pressure compressor and the low pressure compressor panel; extending the air-oil cooler circumferentially about the low pressure compressor; flowing a current of cold air bled from the low pressure compressor over the air-oil cooler; and cooling the hot oil via the air-oil cooler.

In a refinement, the method may further comprise the steps of: flowing the hot oil from the first component of the gas turbine engine to the air-oil cooler; and flowing a cooled oil from the air-oil cooler to a second component of the gas turbine engine.

In another refinement, the method may further comprise the step of: providing an overboard exhaust for the cold air to exit after blowing the cold air over the air-oil cooler.

In another refinement, the method may further comprise the steps of: providing the gas turbine engine with a core nacelle circumferentially around the low pressure compressor; and placing the air-oil cooler radially inwardly from the core nacelle.

In another refinement, the method may further comprise the steps of: providing a firewall in the gas turbine engine, the firewall being positioned longitudinally downstream of the low pressure compressor panel and radially outwardly from the low pressure compressor; and placing the air-oil cooler longitudinally between the fan and the firewall.

In still another refinement, the method may further comprise the step of: placing the air-oil cooler in a cavity between the low pressure compressor and the low pressure compressor panel, the cavity having a height/length ratio of at least 1.5:1.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of heat exchange element or gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
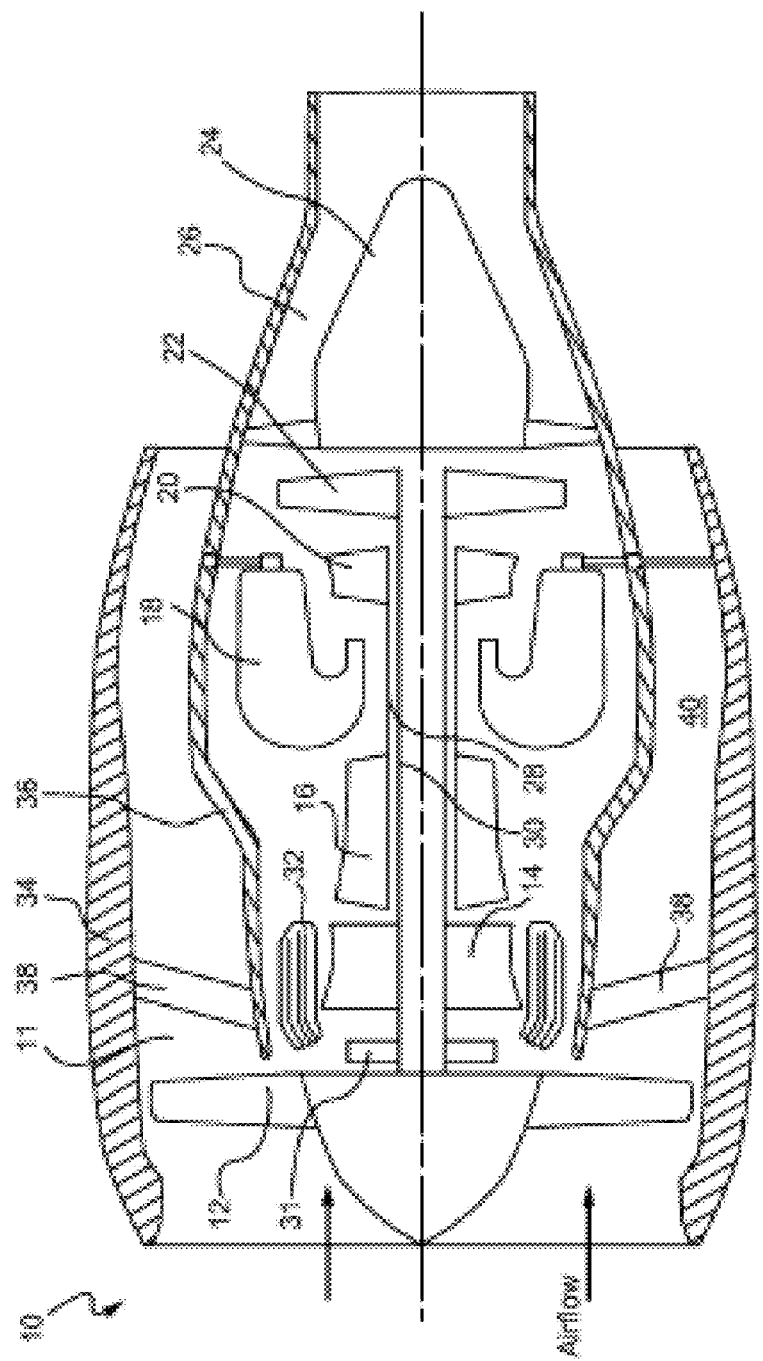
FIG. 1 is a schematic cross-sectional view of a gas turbine engine whose air-oil coolers are constructed in accordance with the teachings of this disclosure.

Referring now to the drawings, and with specific reference to FIG. 1, there is depicted an exemplary gas turbine 10 wherein various embodiments of the present disclosure may be utilized. In this example, the industrial gas turbine 10 may include a compressor section 11 which may comprise, sequentially from the forefront of the gas turbine engine 10, a fan 12, a low pressure compressor 14, a high pressure compressor 16, a combustor chamber 18 downstream of the compressor section 11, a high pressure turbine 20 and a low pressure turbine 22 both downstream of the combustor chamber 18, a tail cone 24, and an exhaust nozzle 26. Further, a high pressure shaft 28 may couple the high pressure compressor 16 with the high pressure turbine 20; while a low pressure shaft 30 may couple the low pressure compressor 14 with the low pressure turbine 22. Both shafts 28 and 30 may be rotatable about an axis A. The low pressure shaft 30 may drive the fan 12 through a gear train 31. There may be a low profile, curved air-oil cooler 32 radially outwardly from the low pressure compressor 14. On the outside, a fan nacelle 34 surrounds both the fan 12 and a core nacelle 36, and supports the core nacelle 36 through pylon structures 38 commonly referred to as upper and lower bifurcations. The core nacelle may house the compressors 14 and 16, the combustor chamber 18, the turbines 20 and 22, and the tail cone 24.

During operation, air suctioned by the fan 12 may be pressurized in the compressors 14 and 16, and mixed with fuels in the combustor 18 to generate hot gases. The hot gases may expand in and flow through the turbines 20 and 22, which extract energy from the hot gases. The turbines 20 and 22 may then power the compressors 14 and 16 as well as the fan 12 through rotor shafts 28 and 30. Finally, the exhaust gases may exit the gas turbine engine through the exhaust nozzle 26. In power generation applications, the turbines 20 and 22 may connect to an electric generator to generate electricity; while in aerospace applications, the exhaust of the turbine 10 can be used to create thrust.

In the examples shown in FIG. 1, the engine 10 may be a high bypass turbofan arrangement. The diameter of turbofan 12 may be substantially larger than the diameter of the low pressure compressor 14 to give a bypass ratio greater than, for example, about 10, while the low pressure turbine 22 may have a pressure ratio that is greater than, for example, about 5. Further, the gear train 31 may be an epicycle gear train, such as, for example, a star gear train, providing a gear reduction ratio of, for example, greater than about 2.5. Further, the fan pressure ratio may be maintained at, for example, about 2.5 or about 1.5. It should be understood, however, that the above parameters are only exemplary of a contemplated geared turbofan engine. Other engines with other operational parameters are possible.

After the airflow enters the fan nacelle 34, the fan 12 may direct part of the air into the core nacelle 36. This part of the air may be used to drive the turbines 20 and 22. The rest of the air may bypass the core nacelle 36 and enter a generally annular bypass flow path 40, which is arranged between the confines of the fan nacelle 34 and core nacelle 36.

For high bypass ratio, low fan pressure ratio turbofan engines, it is typically undesirable to provide any obstructions in the bypass flow path 40, which adversely impacts the efficiency of the engine 10 since most of the thrust is provided by the bypass flow. Therefore, it is desirable to have the low profile air-oil cooler 32 confined within the core nacelle without blocking the bypass blow and keep the core nacelle 36 aerodynamically smooth.

Figure 2:
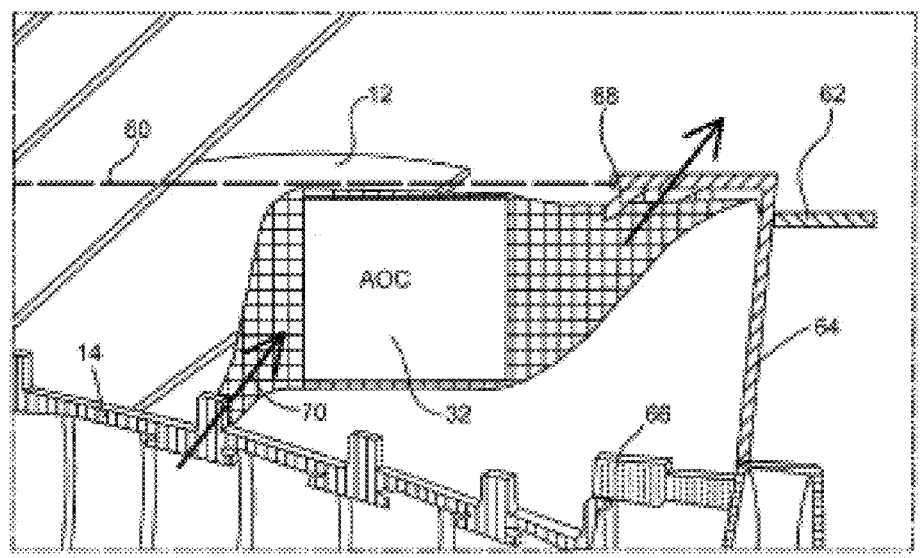
FIG. 2 is a partial, isometric view of an air-oil cooler according to the present disclosure, with a portion of the low pressure compressor panel cut away.

Referring now to FIG. 2, there is depicted a low profile, compressor bleed air-oil cooler 32 (AOC 32) according to the present disclosure. The AOC 32 may be radially located between the low pressure compressor 14 and a low pressure compressor panel 60 and longitudinally spaced between the fan 12 and an inner V-groove 62. The gas turbine engine may have a firewall 64 downstream of the low pressure compressor panel 60 wherein the AOC 32 is longitudinally located between the fan 12 and the firewall 64. In addition, the AOC 32 may be positioned radially outwardly from a 2.5 bleed duct structure 66 and radially inwardly from an overboard exhaust 68. In FIG. 2, the low pressure compressor panel 60 is partially removed along the dotted line to show the relative geometry of the AOC 32. Further, the cooling air blowing from a compressor bleed 70 may flow through the AOC 32 and exit through the overboard exhaust 68. The AOC 32 may adopt a low profile, curved geometry to extend circumferentially about the compressor 14 and not to protrude outside of the low pressure compressor panel 60.

Figure 3:
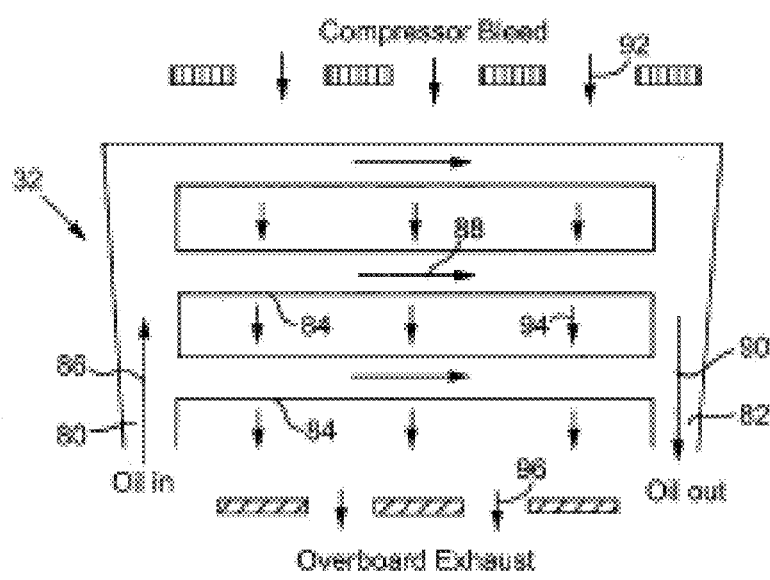
FIG. 3 is a schematic view of the air-oil cooler in FIG. 2 with a one-pass configuration according to the present disclosure.

FIGS. 3-6 display exemplary possible configurations for the AOC 32. Turning now to FIG. 3, a single pass, in series configuration for the AOC 32 is shown. The AOC 32 may comprise an oil inlet 80, and oil outlet 82, and a plurality of heat exchange elements 84 positioned between the oil inlet 80 and oil outlet 82. A hot oil may enter at the oil inlet 80 and flow in the direction of an arrow 86. Then the hot oil from the engine may flow through heat exchange elements 84 in the direction of an arrow 88. Finally, the oil may flow out of the oil outlet 82 in the direction of an arrow 90.

As used herein, the word "oil" refers to a lubricating liquid used in a gas turbine engine. The phrase "hot oil" refers to a lubricating liquid whose temperature is close to or above the upper limit for a predetermined, working temperature for the lubricating liquid.

As to the cooling fluid, the cold air from a compressor bleed may flow in towards the AOC 32 in the direction of an arrow 92. Then the cold air may flow through and absorb heat from the heat exchange elements 84 in the direction of an arrow 94. Finally, the air may flow out through the overboard exhaust in the direction of an arrow 96. Due to the heat exchange process occurred between the hot oil circulating in AOC 32 and the cold air from the compressor bleed, the oil may become sufficiently cold and be used again in other components of the engine after coming out of the oil outlet 82. This single pass configuration is referred to herein as a "one-pass" configuration because the hot oil passes through the cold bleed air once in a heat exchange element. The heat exchange elements 84 may be tubes with a hollow interior.

As is known to a person skilled in the art, the AOC 32 may have elongate manifolds, fins attached to the heat exchange elements, baffles to direct air flows, or other design features beneficial to enhance the heat exchange capacity and efficiency without adversely causing pressure loss to the compressor bleed air. In addition, the heat elements may take the shape of tubes, corrugated sheets, and other physical shapes which have a hollow interior to allow the hot oil to pass through and exchange heat with the compressor bleed air.

Moreover, heat exchange elements 84, oil inlet 80, oil outlet 82 and other portions of the AOC 32 may be made from materials that provide an appropriate balance of strength, heat transfer capability, minimal weight, resistance to creep and impact damage at temperatures in the range of, for example, from about 600° F. (316° C.) to about 1,500° F. (816° C.), and other factors known to those skilled in the art. Suitable materials for the AOC 32 may include, but are not limited to, metals such as, for example titanium and titanium alloys, composites, other materials, and combinations thereof. The temperature of the hot oil entering the AOC 32 may be as high as 320° F. (160° C.). Other temperatures of the entering hot oil are possible.

The source of the cold air for the AOC 32 is air bled from the discharge of the low pressure compressor 14. The air is routed to and through the gas turbine engine in a manner well known in the art as its pressure is high enough to drive itself through the tortuous path associated with the turbine structure, and force the air through the heat exchange elements of the AOC 32.

Figure 4:
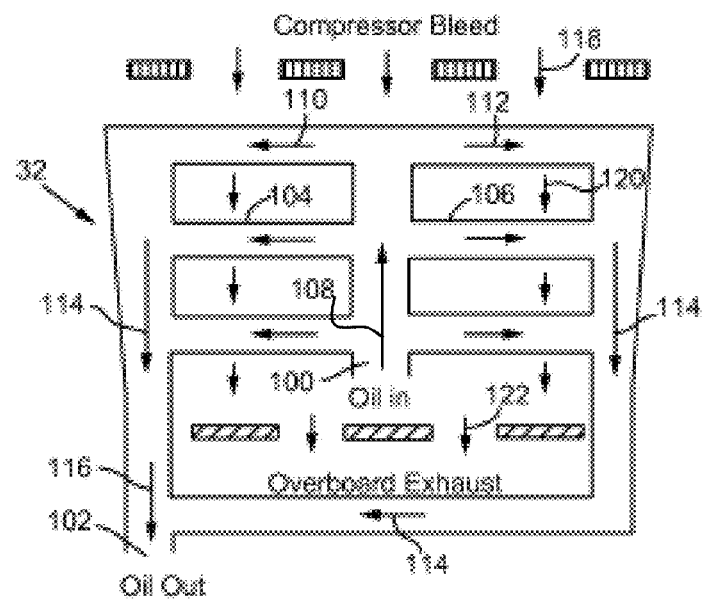
FIG. 4 is a schematic view of the air-oil cooler in FIG. 2 with another one-pass configuration according to the present disclosure.

Referring now to FIG. 4, a single pass, in parallel configuration for the AOC 32 is depicted. The AOC 32 may comprise an oil inlet 100, and oil outlet 102, and a plurality of heat exchange elements 104 and 106 positioned between the oil inlet 100 and oil outlet 102. A hot oil from the engine may enter at the oil inlet 100 and flow in the direction of an arrow 108. Then the hot oil may flow through heat exchange elements 104 in the direction of an arrow 110 or through heat exchange elements 106 in the direction of an arrow 112. The direction of the arrow 110 may be different from the direction of the arrow 112, for example, they may be in the opposite directions. After the oil coming out of heat exchange elements 104 and 106, it may flow in the direction of an arrow 114 towards the oil outlet 102. Finally, the oil may flow out of the oil outlet 102 in the direction of an arrow 116.

As to the cooling fluid, the cold air from a compressor bleed may flow in towards the AOC 32 in the direction of an arrow 118. Then the cold air may flow through and absorb heat from the heat exchange elements 104 and 106 in the direction of an arrow 120. Finally, the air may flow out through the overboard exhaust in the direction of an arrow 122. Due to the heat exchange process occurred between the hot oil circulating in AOC 32 and the cold air from the compressor bleed, the oil may become colder and be used again in other components of the engine after coming out of the oil outlet 102. The characteristics of and considerations for AOC 32 described above when discussing FIG. 3 may apply to the AOC 32 in FIG. 4.

Even though FIG. 4 shows that a part of the structure of AOC, for example the oil outlet 102, is disposed radially outwardly from the overboard exhaust, other configurations, such as, for example, oil outlet 102 locating radially inwardly from the overboard exhaust, are possible.

Figure 5:
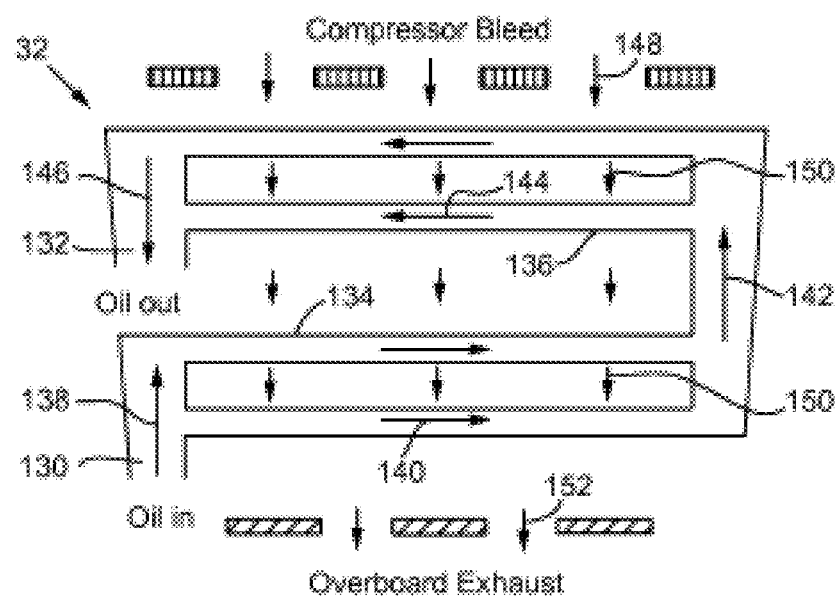
FIG. 5 is a schematic view of the air-oil cooler in FIG. 2 with a two-pass configuration according to the present disclosure.

Turning now to FIG. 5, a double pass, in series configuration for the AOC 32 is illustrated. The AOC 32 may comprise an oil inlet 130, and oil outlet 132, and a plurality of heat exchange elements 134 and 136 positioned between the oil inlet 130 and oil outlet 132. A hot oil from the engine may enter at the oil inlet 130 and flow in the direction of an arrow 138. Then the hot oil may flow through the heat elements 134 in the direction of an arrow 140. After coming out of the heat exchange elements 134, the oil may flow towards the heat elements 136 in the direction of an arrow 142. Subsequently the oil may flow through heat exchange elements 136 in the direction of an arrow 144. The direction of the arrow 134 may be different from the direction of the arrow 144, for example, they may be in the opposite directions. Finally, the oil may flow out of the oil outlet 132 in the direction of an arrow 146.

As to the cooling fluid, the cold air from a compressor bleed may flow in towards the AOC 32 in the direction of an arrow 148. Then the cold air may flow through and absorb heat from the heat exchange elements 134 and 136 in the direction of an arrow 150. Finally, the air may flow out through the overboard exhaust in the direction of an arrow 152. Due to the heat exchange process occurred between the hot oil circulating in AOC 32 and the cold air from the compressor bleed, the oil may become colder and be used again in other components of the engine after coming out of the oil outlet 132. The characteristics of AOC 32 described above when discussing FIG. 3 may apply to the AOC 32 in FIG. 5. This double pass configuration is referred to herein as a "two-pass" configuration because the hot oil passes through the cold bleed air bleed twice in two different heat exchange elements.

Figure 6:
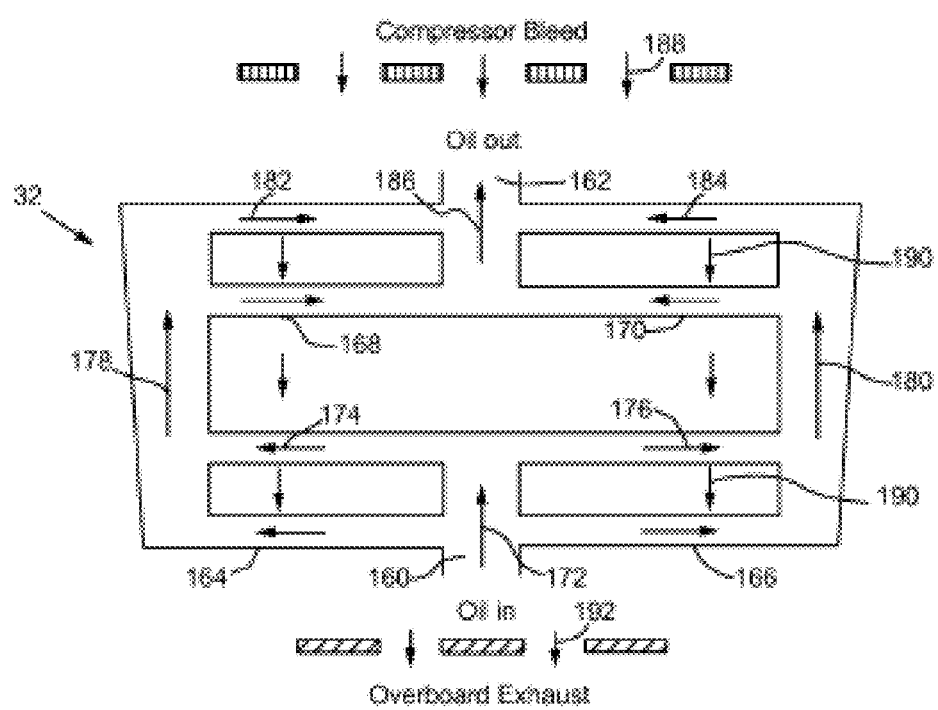
FIG. 6 is a schematic view of the air-oil cooler in FIG. 2 with another two-pass configuration according to the present disclosure.

Referring now to FIG. 6, a double pass, in parallel configuration for the AOC 32 is displayed. The AOC 32 may comprise an oil inlet 160, and oil outlet 162, and a plurality of heat exchange elements 164, 166, 168 and 170 positioned between the oil inlet 160 and oil outlet 162. A hot oil from the engine may enter at the oil inlet 160 and flow in the direction of an arrow 172. Then the hot oil may flow through the heat elements 164 in the direction of an arrow 174 or through the heat elements 166 in the direction of an arrow 176. The direction of the arrow 174 may be different from the direction of the arrow 176, for example, they may be in the opposite directions. After coming out of the heat exchange elements 164, the oil may flow towards the heat elements 168 in the direction of an arrow 178. In addition, after coming out of the heat exchange elements 166, the oil may flow towards the heat elements 170 in the direction of an arrow 180. Subsequently the oil may flow through heat exchange elements 168 in the direction of an arrow 182 or through heat exchange elements 170 in the direction of an arrow 184. The direction of the arrow 182 may be different from the direction of the arrow 184, for example, they may be in the opposite directions. Finally, the oil may flow out of the oil outlet 162 in the direction of an arrow 186.

As to the cooling fluid, the cold air from a compressor bleed may flow in towards the AOC 32 in the direction of an arrow 188. Then the cold air may flow through and absorb heat from the heat exchange elements 164, 166, 168 and 170 in the direction of an arrow 190. Finally, the air may flow out through the overboard exhaust in the direction of an arrow 192. Due to the heat exchange process occurred between the hot oil circulating in AOC 32 and the cold air from the compressor bleed, the oil may become colder and be used again in other components of the engine after coming out of the oil outlet 162. The characteristics of AOC 32 described above when discussing FIG. 3 may apply to the AOC 32 in FIG. 6.

Even though FIGS. 3-6 depict the AOC 32 as having certain relative dimensions, such dimensions are only exemplary and other relative dimensions are possible. Further, although the AOC 32 is shown in FIGS. 3-6 as having a certain number of tubes for each type of heat exchange elements, other numbers of tubes for each type of heat exchange elements are possible. Even though FIGS. 3-6 depict the AOC 32 has either a one- or two-pass configuration, other multiple-pass configurations are possible.

The shape of the AOC 32 and its components may be curved or contoured to fit within the core nacelle structure. Furthermore, the height/length ratio of the cavity in which the AOC 32 resides may be, for example, at least about 1.5:1, and at least about 2.0:1.Other height/length ratios for the cavity are possible, depending on the available packaging space within the core nacelle. Factors to consider when building an AOC 32 may include, but are not limited to, both bleed and oil pressure drop requirements, nacelle hard points when accommodating the AOC 32, optimal aerodynamics and thrust specific fuel consumption (TSFC) benefits, required AOC size and shape, and delta P requirements.

INDUSTRIAL APPLICABILITY

From the foregoing, it can be seen that the present disclosure describes low profile, compressor bleed AOCs and gas turbine engines using thereof. Such AOCs and gas turbine engines may find industrial applicability in many applications including, but not limited to, aerospace applications such as an airplane.

Current trends in gas turbine engine design are requiring a more efficient cooling of the lubrication oil from the engine. By taking advantage of the available packaging volume within the core nacelle and using the low pressure compressor bleed as the coolant, the present disclosure provides a novel solution to provide an efficient AOC without creating nacelle hard points or increasing the cooler size. Based on this efficient, compact and simple design, the present disclosure may provide a novel alternative to building a bigger AOC with excessive drag when dealing with a smaller engine core. With the current disclosure, existing smaller engine core nacelle may be modified to allow the addition of an efficient AOC without a complete redesign of the core nacelle. Moreover, using the novel AOC according to the present disclosure to build gas turbine engines opens up new possibilities for gas turbine engines which may have heretofore been limited by the conventional solutions to AOC, and which may reduce costs associated with redesign the existing engines.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An air-oil cooler for a gas turbine engine which includes a fan, a low pressure compressor downstream of the fan, a low pressure compressor panel which is radially outwardly from the low pressure compressor, and a V-groove downstream of the low pressure compressor panel, the air-oil cooler comprising:
   an oil inlet receiving a hot oil from a component of the gas turbine engine;
   an oil outlet; and
   a plurality of heat exchange elements between the oil inlet and the oil outlet, wherein the air-oil cooler has a curved geometry and extends circumferentially about the low pressure compressor, wherein the air-oil cooler is longitudinally located between the fan and the V-groove and radially spaced between the low pressure compressor and the low pressure compressor panel and the air-oil cooler has a low profile such that the air-oil cooler does not protrude outside of the low pressure compressor panel, and wherein the air-oil cooler receives a current of cold air bled from the low pressure compressor and the current of cold air bled exits the air-oil cooler through an overboard exhaust.

2. The air-oil cooler of claim 1, wherein the air-oil cooler is subjected to the direct action of the current of cold air, and wherein the cold air exits through an overboard exhaust of the engine after flowing over the air-oil cooler.

3. The air-oil cooler of claim 1, wherein the gas turbine engine further comprises a core nacelle which is circumferentially around the low pressure compressor, and wherein the air-oil cooler is positioned radially inwardly from the core nacelle.

4. The air-oil cooler of claim 1, wherein the gas turbine engine further comprises a firewall downstream of the low pressure compressor panel, and wherein the air-oil cooler is longitudinally located between the fan and the firewall.

5. The air-oil cooler of claim 1, wherein the heat exchange elements have a one-pass configuration.

6. The air-oil cooler of claim 1, wherein the heat exchange elements have a two-pass configuration.

7. The air-oil cooler of claim 1, wherein the air-oil cooler is positioned in a cavity between the low pressure compressor and the low pressure compressor panel.

8. A gas turbine engine which includes a fan, a low pressure compressor downstream of the fan, a low pressure compressor panel which is radially outwardly from the low pressure compressor, and a V-groove downstream of the low pressure compressor panel, the gas turbine engine comprising:
    an air-oil cooler, the air oil cooler comprising:
    an oil inlet receiving a hot oil from a component of the gas turbine engine;
    an oil outlet; and
    a plurality of heat exchange elements between the oil inlet and the oil outlet,
    wherein the air-oil cooler has a curved geometry and extends circumferentially about the low pressure compressor, wherein the air-oil cooler is longitudinally located between the fan and the V-groove and radially spaced between the low pressure compressor and the low pressure compressor panel and the air-oil cooler has a low profile such that the air-oil cooler does not protrude outside of the low pressure compressor panel, and wherein the air oil cooler receives a current of cold air bled from the low pressure compressor and the current of cold air bled exits the air-oil cooler through an overboard exhaust.

9. The gas turbine engine of claim 8, wherein the air-oil cooler is subjected to the direct action of the current of cold air, and wherein the cold air exits through an overboard exhaust of the engine after flowing over the air-oil cooler.

10. The gas turbine engine of claim 8, wherein the gas turbine engine further comprises a core nacelle which is circumferentially around the low pressure compressor, and wherein the air-oil cooler is positioned radially inwardly from the core nacelle.

11. The gas turbine engine of claim 8, wherein the gas turbine engine further comprises a firewall downstream of the low pressure compressor panel, and wherein the air-oil cooler is longitudinally located between the fan and the firewall.

12. The gas turbine engine of claim 8, wherein the heat exchange elements have a one-pass configuration.

13. The gas turbine engine of claim 8, wherein the heat exchange elements have a two-pass configuration.

14. The gas turbine engine of claim 8, wherein the air-oil cooler is positioned in a cavity between the low pressure compressor and the low pressure compressor panel.

15. A method of operating an air-oil cooler for use on a gas turbine engine which includes a fan, a low pressure compressor downstream of the fan, a low pressure compressor panel which is radially outwardly from the low pressure compressor, and a V-groove downstream of the low pressure compressor panel, the method comprising the steps of:
    providing the air-oil cooler with a curved geometry extending circumferentially about the low pressure compressor and an oil inlet receiving a hot oil from a first component of the gas turbine engine, an oil outlet, and a plurality of heat exchange elements between the oil inlet and oil outlet;
    placing the air-oil cooler longitudinally between the fan and the V-groove and radially between the low pressure compressor and the low pressure compressor panel, the air-oil cooler having a low profile such that the air-oil cooler does not protrude outside of the low pressure compressor panel;
    extending the air-oil cooler circumferentially about the low pressure compressor;
    flowing a current of cold air bled from the low pressure compressor over the air-oil cooler;
    cooling the hot oil via the air-oil cooler; and
    exiting the current of cold air bled from the air-oil cooler into a core nacelle of the gas turbine engine.

16. The method of claim 15, further comprising the steps of:
    flowing the hot oil from the first component of the gas turbine engine to the air-oil cooler; and
    flowing a cooled oil from the air-oil cooler to a second component of the gas turbine engine.

17. The method of claim 15, further comprising the step of:
    providing an overboard exhaust for the cold air to exit after blowing the cold air over the air-oil cooler.

18. The method of claim 15, further comprising the steps of:
    providing the gas turbine engine with the core nacelle circumferentially around the low pressure compressor; and
    placing the air-oil cooler radially inwardly from the core nacelle.

19. The method of claim 15, further comprising the steps of:
    providing a firewall in the gas turbine engine, the firewall being positioned longitudinally downstream of the low pressure compressor panel and radially outwardly from the low pressure compressor; and
    placing the air-oil cooler longitudinally between the fan and the firewall.

20. The method of claim 15, further comprising the step of:
    placing the air-oil cooler in a cavity between the low pressure compressor and the low pressure compressor panel.

* * * * *